United States Patent
Zhou et al.

(10) Patent No.: US 9,097,608 B2
(45) Date of Patent: Aug. 4, 2015

(54) METHOD FOR DETECTING HIGH-PRESSURE SEALING PERFORMANCE OF GAS SYSTEM AFTER IMPACT TEST OF COMPRESSED NATURAL GAS VEHICLE

(75) Inventors: Yang Zhou, Wuhan (CN); Huijun Zheng, Wuhan (CN); Henghui Li, Wuhan (CN)

(73) Assignee: DONGFENG PEUGEOT CITROEN AUTOMOBILE COMPANY LTD., Wuhan (CN)

( * ) Notice: Subject to any disclaimer, the term of this patent is extended or adjusted under 35 U.S.C. 154(b) by 289 days.

(21) Appl. No.: 13/548,239

(22) Filed: Jul. 13, 2012

(65) Prior Publication Data
US 2013/0000380 A1    Jan. 3, 2013

Related U.S. Application Data

(63) Continuation-in-part of application No. PCT/CN2010/080293, filed on Dec. 27, 2010.

(30) Foreign Application Priority Data

Jan. 26, 2010 (CN) .......................... 2010 1 0103805

(51) Int. Cl.

| | |
|---|---|
| *G01M 3/28* | (2006.01) |
| *G01M 3/32* | (2006.01) |
| *G01M 3/02* | (2006.01) |
| *F02M 21/02* | (2006.01) |
| *F02D 19/02* | (2006.01) |
| *B60K 15/03* | (2006.01) |
| *F02D 41/00* | (2006.01) |
| *F02D 41/22* | (2006.01) |

(52) U.S. Cl.
CPC ........... *G01M 3/2815* (2013.01); *F02D 19/025* (2013.01); *F02D 19/026* (2013.01); *F02M 21/029* (2013.01); *F02M 21/0215* (2013.01); *F02M 21/0293* (2013.01); *G01M 3/025* (2013.01); *G01M 3/3272* (2013.01); *B60K 15/03006* (2013.01); *B60K 2015/03013* (2013.01); *B60K 2015/03447* (2013.01); *F02D 41/0027* (2013.01); *F02D 2041/224* (2013.01); *Y02T 10/32* (2013.01)

(58) Field of Classification Search
CPC .......................... G01M 3/2815; G01M 3/3272
See application file for complete search history.

(56) References Cited

U.S. PATENT DOCUMENTS 5,644,072 A * 7/1997 Chirco et al. .................. 73/49.2

* cited by examiner

*Primary Examiner* — Paul West
(74) *Attorney, Agent, or Firm* — Matthias Scholl P.C.; Matthias Scholl

(57) ABSTRACT

A method for detecting the high-pressure sealing performance of a gas system after an impact test of a compressed natural gas vehicle, including installing a high-pressure sensor with a characteristic curve on an air inlet pipe of a pressure reducer, and inflating a high-pressure pipeline with compressed gas under a safe pressure; inflating the gas system with compressed gas to a normal working pressure before the impact test of the compressed natural gas vehicle; collecting a voltage value by the high-pressure sensor within 1-3 hours, and determining that the sealing performance of the gas system of the compressed natural gas vehicle is satisfactory when a detected voltage drop value is smaller than a preset value; otherwise, determining that the sealing performance of the gas system of the compressed natural gas vehicle is unsatisfactory.

16 Claims, 3 Drawing Sheets

METHOD FOR DETECTING HIGH-PRESSURE SEALING PERFORMANCE OF GAS SYSTEM AFTER IMPACT TEST OF COMPRESSED NATURAL GAS VEHICLE

CROSS-REFERENCE TO RELATED APPLICATIONS

This application is a continuation-in-part of International Patent Application No. PCT/CN2010/080293 with an international filing date of Dec. 27, 2010, designating the United States, now pending, and further claims priority benefits to Chinese Patent Application No. 201010103805.0 filed Jan. 26, 2010. The contents of all of the aforementioned applications, including any intervening amendments thereto, are incorporated herein by reference.

CORRESPONDENCE ADDRESS

Inquiries from the public to applicants or assignees concerning this document should be directed to: MATTHIAS SCHOLL P.C., ATTN.: DR. MATTHIAS SCHOLL ESQ., 14781 MEMORIAL DRIVE, SUITE 1319, HOUSTON, Tex. 77079.

BACKGROUND OF THE INVENTION

1. Field of the Invention

The invention relates to a detection technology of a vehicle system, and more particularly to a method for detecting the high-pressure sealing performance of a gas system of a compressed natural gas vehicle.

2. Description of the Related Art

Compressed natural gas vehicles have being developed quickly. However, there is no method and standard for safely detecting the high-pressure sealing performance of a gas system of a compressed natural gas vehicle in and after an impact test.

Conventional detecting methods widely used currently include a leak detecting solution (neutral foaming solution) detecting method and an explosion-proof gas detector. However, these methods are not suitable for the safety detection of the high-pressure sealing performance of a gas system after an impact test of a compressed natural gas vehicle.

After an impact test of a compressed natural gas vehicle, under the condition of without destroying the existing pipeline system and pipeline connector of the vehicle, the gas system of the compressed natural gas (CNG) vehicle is filled with compressed air or nitrogen gas (20 Mpa), and then the high-pressure sealing performance of the gas system of the vehicle is detected. However, the detector does not know whether the gas system of the vehicle leaks, when the leak detecting solution or explosion-proof gas detector is directly adopted for detection, it may cause the consequence: if the gas system partially leaks, the personal safety of the detector will be hurt unpredictably.

As for the technology and method for safely detecting the high-pressure sealing performance of a gas system after an impact test of a compressed natural gas vehicle, the method for detection has not been given in detail, and the corresponding regulations and standards are defined vaguely. The safety detection of the high-pressure sealing performance of the gas system after the impact test of the compressed natural gas vehicle has been done in America, and only the sealing requirement for the gas system is regulated in the FMVSS303 standard, that is, the detecting technology and detecting method are not defined in detail for the quantification of pressure drop within a certain period of time, the safety is poor, and the operability is not strong. Currently, the method is still in blank in this industry.

SUMMARY OF THE INVENTION

In view of the above-described problems, it is one objective of the invention to provide a safe and reliable method for detecting the high-pressure sealing performance of a gas system after an impact test of a compressed natural gas vehicle.

To achieve the above objective, in accordance with one embodiment of the invention, there provided is a method for detecting the high-pressure sealing performance of a gas system after an impact test of a compressed natural gas vehicle, the method comprising: installing a high-pressure sensor with a characteristic curve on an air inlet pipe of a pressure reducer, and inflating a high-pressure pipeline with compressed gas under safe pressure; inflating the gas system with compressed gas in normal working pressure before the impact test of the compressed natural gas vehicle; collecting a voltage value through the high-pressure sensor within 1-3 hours, and determining that the sealing performance of the gas system of the compressed natural gas vehicle is qualified when a detected voltage drop value is smaller than a preset value; otherwise, determining that the sealing performance of the gas system of the compressed natural gas vehicle is unqualified; wherein the formula of the characteristic curve of the high-pressure sensor is as follows: $V_O = (A + B/P_{max} * Pressure * T)/(100 * V_{dd})$, $P_{max}$ represents the maximum range pressure (bar) of the high-pressure sensor, Pressure represents an input pressure (bar) of the gas system, $V_{dd}$ represents a service voltage (V) of the high-pressure sensor, $V_O$ represents an output voltage of the high-pressure sensor, A represents a $V_O$ value when Pressure is 0, and B represents a $V_O$ value when Pressure is $P_{max}$; T represents the detection time; and the high-pressure sensor is a piezoresistive pressure sensor.

The piezoresistive pressure sensor is manufactured based on the piezoresistive effect principle of a semiconductor material (single crystal silicon), and a diffused piezoresistor is manufactured directly on a silicon flat diaphragm in a certain crystal direction by adopting the integrated circuit technology. When the silicon flat diaphragm is under pressure, the deformation of the diaphragm will alter the resistance of the diffused piezoresistor. The piezoresistor on the silicon flat diaphragm generally constitutes a bridge type measuring circuit, opposite bridge arm resistors are symmetrically arranged, and when resistance is altered, the output voltage of an electrical bridge is proportional to the pressure applied to the diaphragm.

The high-pressure sensor feedbacks the gas medium information monitored at the air inlet of the pressure reducer in real time to a gas management system (ECU). The real-time information comprises dynamic gas volume information and abnormal gas volume information, and the ECU transmits the real-time information to a changeover switch, a high-pressure solenoid valve, and other terminals for execution according to the classification of information.

Under the premise of without destroying the pipeline and connector of a high-pressure system, the measured pressure is directly transformed into various electrical quantities by using a detecting method with physical characteristics (according to the principle that some physical characteristics of a sensitive element are proportional to pressure under the action of pressure). A wire harness connector adapter is installed on a three-port wire harness connector of the high-pressure sensor, two wire harnesses are led out through the adapter and accessed into a calibrated digital display universal electric meter or secondary converter, and the voltage value signal fedback to the ECU by the high-pressure sensor is read for detection.

The pressure drop value in the gas system is smaller than the preset value based on the minimum damage of leakage of high-pressure gas to human body; according to the type of different gas systems used in a vehicle, it's artificially set to 0.5-3 Mpa and generally is 1 Mpa, but not limited to the scope. The approved pressure injected into a fuel gas cylinder is also an artificial preset value and can be 0-20 Mpa, and the approved pressure injected into the fuel gas cylinder is generally 20 Mpa during testing, but not limited to the scope.

Whether the gas system leaks after the impact test of the compressed natural gas vehicle is determined according to the drop value of voltage detected by the high-pressure sensor with performance of characteristic curve ($V_O=(A+B/P_{max}*Pressure*T)/(100*V_{dd})$) in unit time; the input voltage values $V_{dd}$ of different types of high-pressure sensors correspond to different values A and B, and the obtained values A and B are determined according to the Testing Standards of Input and Output Characteristics of a Sensor EP60770-1 1999 in EURUPEAN STANDARD published in Europe in 1999.

As for the high-pressure sensor with $V_{dd}$=5 volts, A=10, B=80, and $P_{max}$=250 volts, when the detection time of the vehicle is within 1 hour, the corresponding detected voltage drop value should be smaller than ΔV which is 0.67 V.

As for the high-pressure sensor with $V_{dd}$=5 volts, A=10, B=80, and $P_{max}$=260 volts, when the detection time of the vehicle is within 1 hour, the corresponding detected voltage drop value should be smaller than ΔV which is 0.66 V.

As for the high-pressure sensor with $V_{dd}$=5 volts, A=10, B=78.2, and $P_{max}$=250 volts, when the detection time of the vehicle is within 1 hour, the corresponding detected voltage drop value should be smaller than ΔV which is 0.67 V.

As for the high-pressure sensor with $V_{dd}$=5 volts, A=10, B=80, and $P_{max}$=250 volts, when the detection time of the vehicle is within 2 hours, the corresponding detected voltage drop value should be smaller than ΔV which is 0.84 V.

As for the high-pressure sensor with $V_{dd}$=5 volts, A=10, B=80, and $P_{max}$=250 volts, when the detection time of the vehicle is within 2 hours, the corresponding detected voltage drop value should be smaller than ΔV which is 1.01 V.

As for the high-pressure sensor with $V_{dd}$=5 volts, A=10, B=80, and $P_{max}$=260 volts, when the detection time of the vehicle is within 2 hours, the corresponding detected voltage drop value should be smaller than ΔV which is 0.83 V.

As for the high-pressure sensor with $V_{dd}$=5 volts, A=10, B=80, and $P_{max}$=260 volts, when the detection time of the vehicle is within 3 hours, the corresponding detected voltage drop value should be smaller than ΔV which is 0.99 V.

As for the high-pressure sensor with $V_{dd}$=5 volts, A=10, B=78.2, and $P_{max}$=250 volts, when the detection time of the vehicle is within 3 hours, the corresponding detected voltage drop value should be smaller than ΔV which is 0.83 V.

As for the high-pressure sensor with $V_{dd}$=5 volts, A=10, B=78.2, and $P_{max}$=250 volts, when the detection time of the vehicle is within 3 hours, the corresponding detected voltage drop value should be smaller than ΔV which is 1.00 V.

Advantages of the invention are summarized below. Firstly, the invention solves the problem of judging whether the pipeline and connector of the high-pressure system leak; secondly, the invention provides the safety judgment conditions of the operating method (leak detecting solution method) used for the leakage point; and thirdly, the invention protects the personal safety of testing staff.

Characteristics: high sensitivity coefficient, the sensitivity coefficient is 50-100 times larger than that of a metal strain type pressure sensor, and the output pressure of the piezoresistive pressure sensor can be directly measured without an amplifier. The piezoresistive pressure sensor has a small structural size, light weight, firm structure, impact and vibration resistance, high pressure resolution, high frequency response (not only the micropressure as small as blood pressure can be detected, but also the fluctuating pressure of tens of kilohertz), high operational reliability, high precision, long service life, and temperature compensation function; its precision can reach ±0.2%-0.02%. The quantification of detecting index of safety performance of the gas system after the impact test is easy for practice operation and has high safety coefficient.

BRIEF DESCRIPTION OF THE DRAWINGS

In FIG. 1, $V_O=(10+80/P_{max}*Pressure*T)/(100*V_{dd})$, $P_{max}$=260 bar; $V_{dd}$=5 volts, T=1 h, 2 h, or 3 h.

In FIG. 2, $V_O=(10+80/P_{max}*Pressure*T)/(100*V_{dd})$, $P_{max}$=250 bar; $V_{dd}$=5 volts, T=1 h, 2 h, or 3 h.

In FIG. 3, $V_O=(10+78.2/P_{max}*Pressure*T)/(100*V_{dd})$, $P_{max}$=250 bar; $V_{dd}$=5 volts, T=1 h, 2 h, or 3 h.

DETAILED DESCRIPTION OF THE EMBODIMENTS

Method and steps for safely detecting the high-pressure sealing performance of a gas system after an impact test are as follows:

Visually inspecting the high-pressure pipeline and connector of the compressed natural gas (CNG) vehicle, and safely detecting the sealing performance of the gas system of the compressed natural gas vehicle under the condition that there is no visible damage and leakage at the high-pressure pipeline and connector of the compressed natural gas (CNG) vehicle.

Preparations before the impact test comprise:

(1) Visually inspecting the high-pressure pipeline and connector of the compressed natural gas vehicle, and determining whether there is visible damage and leakage at the high-pressure pipeline and connector of the compressed natural gas vehicle;

(2) Mounting a high-pressure sensor with a characteristic curve at an air inlet of a pressure reducer, and connecting an external voltage power supply for external calibration;

(3) Carrying out wire harness connection to the high-pressure sensor; the concrete wire harness connection method comprising: connecting a positive data output terminal of the high-pressure sensor with a positive terminal of a voltage digital display instrument or secondary converter, connecting a positive terminal of a power supply for the high-pressure sensor with that of an adjustable power supply, and connecting a negative terminal of the power supply for the high-pressure sensor with a negative terminal of the adjustable power supply, the voltage digital display instrument, or the secondary converter;

(4) Inflating the gas system of the compressed natural gas (CNG) vehicle with 20 MPa nitrogen (N2) or dry compressed air, placing the gas system of the compressed natural gas (CNG) vehicle in a ventilated test room for 2-8 hours, then reinflating the gas system of the compressed natural gas (CNG) vehicle with 20 MPa nitrogen (N2) or dry compressed air, and keeping the temperature of the gas cylinder at 20° C.

Figure 1:
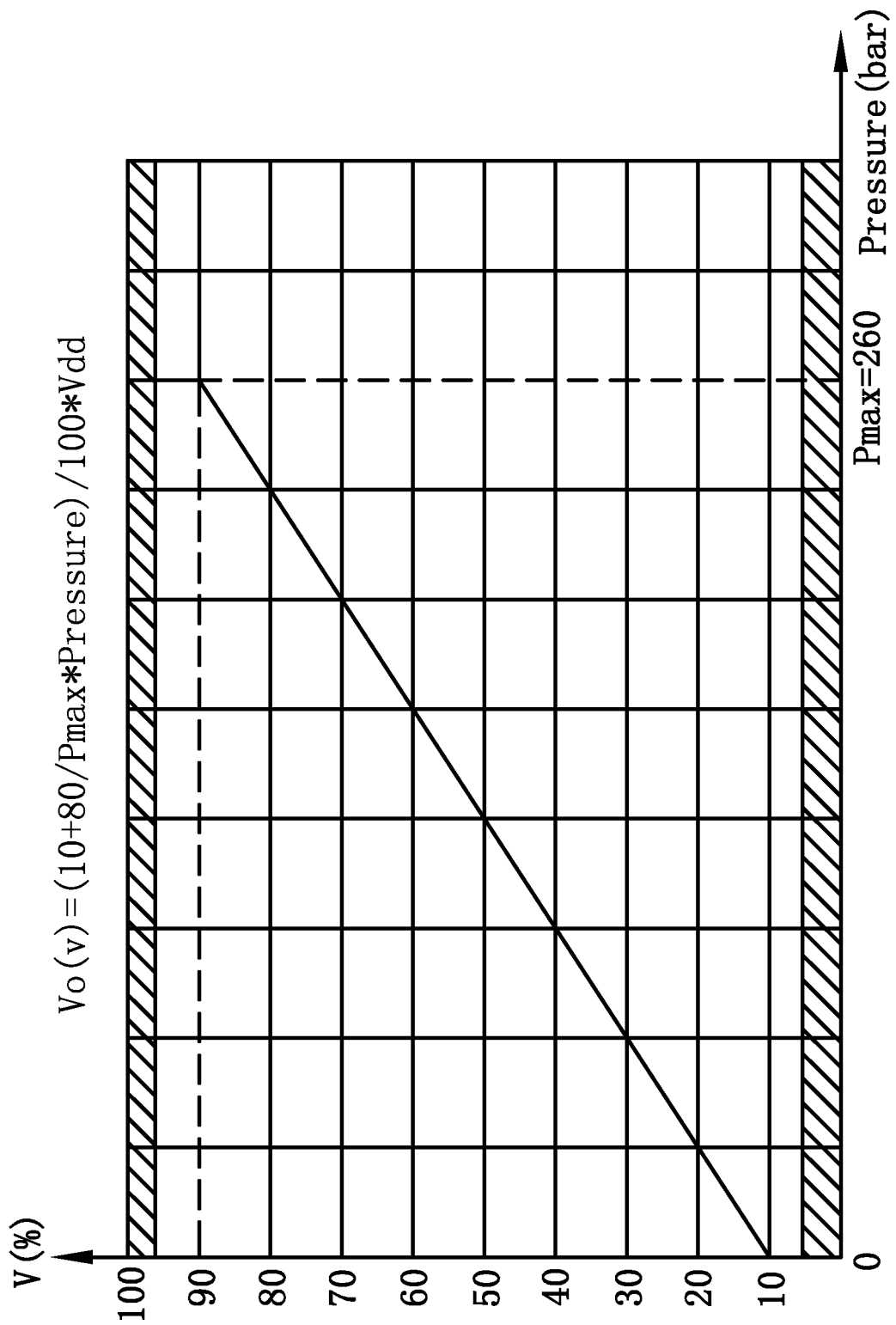
FIG. 1 is a physical characteristic diagram of a sensor I in FIG. 1.
Figure 2:
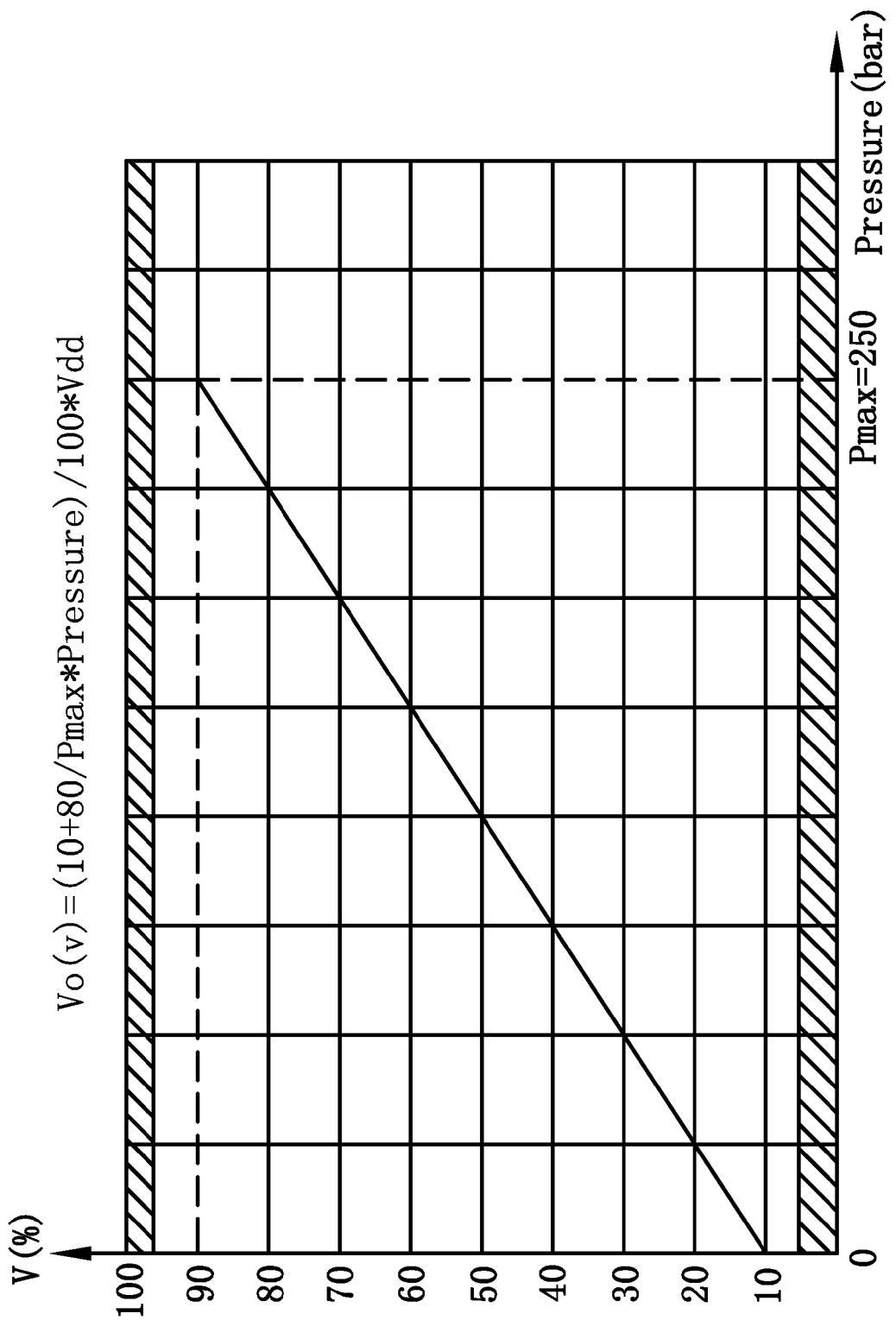
FIG. 2 is a physical characteristic diagram of a sensor II in FIG. 2.
Figure 3:
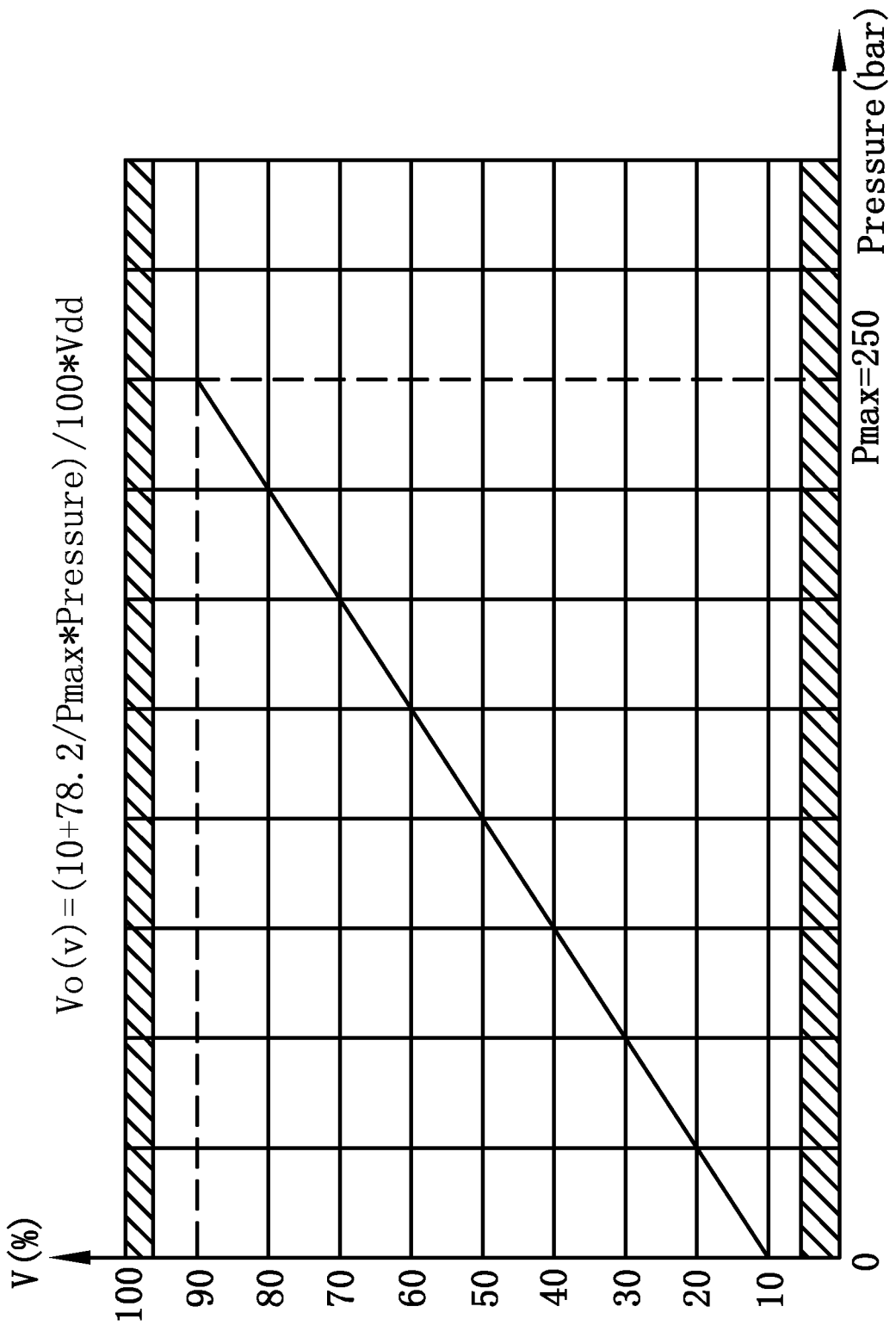
FIG. 3 is a physical characteristic diagram of a sensor III in FIG. 3.

The method for detecting the high-pressure sealing performance of the gas system after the impact test is summarized below:

a) A starting switch of the external voltage power supply is started, so that the vehicle is in the energized state. An area is selected on one side of high pressure of the gas system of the compressed natural gas vehicle for measuring and recording the voltage value;

b) The vehicle is placed in a detection workshop and detected for 1-3 hours, the universal electric meter or secondary converter is read once every 15-30 minutes, and the corresponding voltage value and detection time are recorded;

c) The first measured voltage value is compared with the last measured voltage value, and if the voltage drop value is smaller than 0.67 V (The corresponding voltage drop value within 2 hours shall be smaller than 0.84 V, or the corresponding voltage drop value within 3 hours shall be smaller than 1.01 V), the high-pressure sensor has the physical characteristics in FIG. 2;

specifically,
(10+80/250 bar*10.62 bar)/100*5 V=0.66992 V≈0.67 V
(10+80/250 bar*10.62 bar*2)/100*5 V=0.83984 V≈0.84 V
(10+80/250 bar*10.62 bar*3)/100*5 V=1.00976 V≈1.01 V if the voltage drop value is smaller than 0.67 V (The corresponding voltage drop value within 2 hours shall be smaller than 0.83 V, or the corresponding voltage drop value within 3 hours shall be smaller than 1.00 V), the high-pressure sensor has the physical characteristics in FIG. 3;

specifically,
(10+78.2/250 bar*10.62 bar)/100*5 V=0.66610 V≈0.67 V
(10+78.2/250 bar*10.62 bar*2)/100*5 V=0.83219 V≈0.83 V
(10+78.2/250 bar*10.62 bar*3)/100*5 V=0.99829 V≈1.00 V if the voltage drop value is smaller than 0.66 V (The corresponding voltage drop value within 2 hours shall be smaller than 0.83 V, or the corresponding voltage drop value within 3 hours shall be smaller than 0.99 V), the high-pressure sensor has the physical characteristics in FIG. 1; thus, it can be determined that the sealing performance of the gas system of the compressed natural gas (CNG) vehicle is qualified; otherwise, the sealing performance of the gas system of the compressed natural gas (CNG) vehicle is unqualified;

specifically,
(10+80/260 bar*10.62 bar)/100*5 V=0.66338 V≈0.66 V
(10+80/260 bar*10.62 bar*2)/100*5 V=0.82677 V≈0.83 V
(10+80/260 bar*10.62 bar*3)/100*5 V=0.99015 V≈0.99 V d) If the sealing performance of the gas system of the compressed natural gas (CNG) vehicle is unqualified, after the gas pressure in the high-pressure system of the complete vehicle drops to the scope of pressure safety protection, i.e., the voltage value detected under high pressure in real time is smaller than 0.98 V, 0.96 V, or 0.97 V, the leak detecting solution detecting method is adopted for determining the specific leakage location, and then making records and taking photos.

specifically,
(10+80*250 bar*30 bar)/100*5 V=0.98 V≈0.98 V
(10+80*260 bar*30 bar)/100*5 V=0.96154 V≈0.96 V
(10+78.2/250 bar*30 bar)/100*5 V=0.9692 V≈0.97 V 30 bar refers to the upper limit value defined by the intermediate pressure of safety working pressure in pressure classification definition in Clause 2 of the ECE R110-2008 automobile technical regulations (ECE regulations for short) issued by Economic Commission for Europe (ECE).

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for detecting the sealing performance of a gas system of a compressed natural gas vehicle, the compressed natural gas vehicle comprising a pressure reducer and a high-pressure pipeline, the method comprising:

a) installing a high-pressure sensor on an air inlet pipe of the pressure reducer, and introducing a first compressed gas into the high-pressure pipeline;

b) introducing a second compressed gas in normal working pressure into the gas system;

c) collecting a first voltage value and a second voltage value by the high-pressure sensor; and d) determining that the sealing performance of the gas system of the compressed natural gas vehicle is qualified when a difference between the first voltage value and the second voltage value is smaller than a preset value; otherwise, determining that the sealing performance of the gas system of the compressed natural gas vehicle is unqualified;

wherein:

the high-pressure sensor comprises a characteristic curve; and the formula of the characteristic curve is as follows:
$V_O = (A + B/P_{max} * \text{Pressure} * T)/(100 * V_{dd})$;

wherein:

$P_{max}$ represents the maximum pressure value (bar) of the high-pressure sensor;

Pressure represents an input pressure (bar) of the gas system;

$V_{dd}$ represents a service voltage (V) of the high-pressure sensor;

$V_O$ represents an output voltage of the high-pressure sensor;

A represents a $V_O$ value when Pressure is 0;

B represents a $V_O$ value when Pressure is $P_{max}$; and

T represents a detection time of c);

the high-pressure sensor is a piezoresistive pressure sensor;

a) and b) are performed before an impact test on the compressed natural gas vehicle;

c) and d) are performed after the impact test; and c) is performed for a time period of 1-3 hours after the impact test, the first voltage value is collected at a beginning of the time period, and the second voltage value is collected at an end of the time period.

2. The method of claim 1, wherein $V_{dd}$=5 volts, A=10, B=80, and $P_{max}$=250 bar, c) is performed for 1 hour, and the difference between the first voltage value and the second voltage value is smaller than 0.67 V.

3. The method of claim 1, wherein $V_{dd}$=5 volts, A=10, B=80, and $P_{max}$=260 bar, c) is performed for 1 hour, and the difference between the first voltage value and the second voltage value is smaller than 0.66 V.

4. The method of claim 1, wherein $V_{dd}$=5 volts, A=10, B=78.2, and $P_{max}$=250 bar, c) is performed for 1 hour, and the difference between the first voltage value and the second voltage value is smaller than 0.67 V.

5. The method of claim 1, wherein $V_{dd}$=5 volts, A=10, B=80, and $P_{max}$=250 bar, c) is performed for 2 hours, and the difference between the first voltage value and the second voltage value is smaller than 0.84 V.

6. The method of claim 1, wherein $V_{dd}$=5 volts, A=10, B=80, and $P_{max}$=250 bar, c) is performed for 2 hours, and the difference between the first voltage value and the second voltage value is smaller than 1.01 V.

7. The method of claim 1, wherein $V_{dd}$=5 volts, A=10, B=80, and $P_{max}$=260 bar, c) is performed for 2 hours, and the difference between the first voltage value and the second voltage value is smaller than 0.83 V.

8. The method of claim 1, wherein $V_{dd}$=5 volts, A=10, B=80, and $P_{max}$=260 bar, c) is performed for 3 hours, and the difference between the first voltage value and the second voltage value is smaller than 0.99 V.

9. The method of claim 1, wherein $V_{dd}$=5 volts, A=10, B=78.2, and $P_{max}$=250 bar, c) is performed for 3 hours, and the difference between the first voltage value and the second voltage value is smaller than 0.83 V.

10. The method of claim 1, wherein $V_{dd}$=5 volts, A=10, B=78.2, and $P_{max}$=250 bar, c) is performed for 3 hours, and the difference between the first voltage value and the second voltage value is smaller than 1.00 V.

11. The method of claim 1, wherein in c), a universal electric meter is read once every 15-30 minutes.

12. The method of claim 1, further comprises detecting, recording, and photographing a leakage location of the gas system if the sealing performance of the gas system of the compressed natural gas vehicle is determined to be unqualified and when the second voltage value is smaller than 0.98 V.

13. The method of claim 1, wherein the second compressed gas in normal working pressure is 20 MPa nitrogen or dry compressed air.

14. The method of claim 1, wherein:
c) comprises:
1) energizing the compressed natural gas vehicle; and
2) placing the compressed natural gas vehicle in a detection workshop and detecting the compressed natural gas vehicle for 1-3 hours, reading a universal electric meter once every 15-30 minutes, and recording the first voltage value, the second voltage value, and the detection time; and
d) comprises:
1) calculating a difference between the first voltage value and the second voltage value, the second voltage value being collected 1 hour, 2 hours, or 3 hours after the impact test, and
if a first high-pressure sensor having a first characteristic curve is employed, and the difference between the first voltage value and the second voltage value is respectively smaller than 0.67 V, smaller than 0.84 V, or smaller than 1.01 V, determining that the sealing performance of the gas system of the compressed natural gas vehicle is qualified; otherwise, determining that the sealing performance of the gas system of the compressed natural gas vehicle is unqualified;
the formula of the first characteristic curve being:

$V_O=(10+80/P_{max}*Pressure*T)/(100*V_{dd})$ $P_{max}$=250 bar; $V_{dd}$=5 volts;

if a second high-pressure sensor having a second characteristic curve is employed, and the difference between the first voltage value and the second voltage value is respectively smaller than 0.67 V, smaller than 0.83 V, or smaller than 1.00 V, determining that the sealing performance of the gas system of the compressed natural gas vehicle is qualified; otherwise, determining that the sealing performance of the gas system of the compressed natural gas vehicle is unqualified;
the formula of the second characteristic curve being:

$V_O=(10+78.2/P_{max}*Pressure*T)/(100*V_{dd})$ $P_{max}$=250 bar; $V_{dd}$=5 volts; and if a third high-pressure sensor having a third characteristic curve is employed, and the difference between the first voltage value and the second voltage value is respectively smaller than 0.66 V, smaller than 0.83 V, or smaller than 0.99 V, determining that the sealing performance of the gas system of the compressed natural gas vehicle is qualified; otherwise, determining that the sealing performance of the gas system of the compressed natural gas vehicle is unqualified;
the formula of the third characteristic curve being:

$V_O=(10+80/P_{max}*Pressure*T)/(100*V_{dd})$ $P_{max}$=260 bar; $V_{dd}$=5 volts;

2) detecting, recording, and photographing a leakage location if the sealing performance of the gas system of the compressed natural gas vehicle is determined to be unqualified, and when the second voltage value is smaller than 0.98 V.

15. The method of claim 14, wherein a) comprises:
1) visually inspecting the high-pressure pipeline and a connector of the compressed natural gas vehicle, and determining whether there is visible damage and leakage at the high-pressure pipeline and the connector of the compressed natural gas vehicle;
2) mounting the high-pressure sensor at an air inlet of the pressure reducer, and connecting an external voltage power supply to the compressed natural gas vehicle; and
3) connecting a positive data output terminal of the high-pressure sensor with a positive terminal of a voltage digital display instrument, connecting a positive terminal of a power supply for the high-pressure sensor with a positive terminal of an adjustable power supply, and connecting a negative terminal of the power supply for the high-pressure sensor with a negative terminal of the adjustable power supply or the voltage digital display instrument; and
b) comprises:
introducing 20 MPa nitrogen or dry compressed air into the gas system, placing the gas system in a ventilated test room for 2-8 hours, introducing 20 MPa nitrogen or dry compressed air into the gas system, and keeping the temperature of the gas cylinder at 20° C.

16. In a method for detecting the sealing performance of a gas system of a compressed natural gas vehicle, the compressed natural gas vehicle comprising a pressure reducer and a high-pressure pipeline, the method comprising:
a) installing a high-pressure sensor having a characteristic curve on an air inlet pipe of the pressure reducer, and introducing a first compressed gas into the high-pressure pipeline, the high-pressure sensor being a piezoresistive pressure sensor;
b) introducing a second compressed gas in normal working pressure into the gas system;
c) detecting a first voltage value and a second voltage value by the high-pressure sensor; and
d) determining that the sealing performance of the gas system of the compressed natural gas vehicle is qualified when a difference between the first voltage value and the second voltage value is smaller than a preset value;

otherwise, determining that the sealing performance of the gas system of the compressed natural gas vehicle is unqualified;

the improvement comprises:

the formula of he characteristic curve is $V_O = (A + B / P_{max} *$ Pressure $* T) / (100 * V_{dd})$;

wherein:

P$_{max}$ represents the maximum pressure value (bar) of the high-pressure sensor;

Pressure represents an input pressure (bar) of the gas system;

$V_{dd}$ represents a service voltage (V) of the high-pressure sensor;

$V_O$ represents an output voltage of the high-pressure sensor;

A represents a $V_O$ value when Pressure is 0;

B represents a $V_O$ value when Pressure is P$_{max}$; and

T represents a detection time of c);

a) and b) are performed before an impact test on the compressed natural gas vehicle;

c) and d) are performed after the impact test;

c) is performed for a time period of 1-3 hours after the impact test, the first voltage value is detected at a beginning of the time period, and the second voltage value is detected at an end of the time period; and the method further comprises detecting, recording, and photographing a leakage location of the gas system if the sealing performance of the gas system is determined to be unqualified and if the second voltage value is smaller than 0.98 V.

\* \* \* \* \*